F. LEADBEATER.
VALVE.
APPLICATION FILED SEPT. 16, 1909.
956,811.
Patented May 3, 1910.
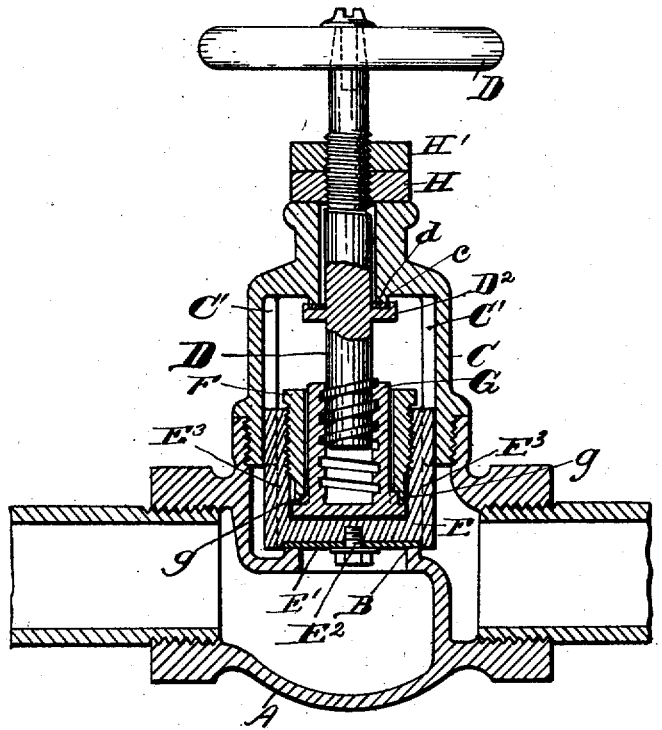
Fig. 1.
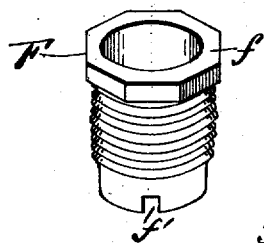
Fig. 2.
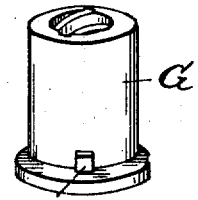
Fig. 3.
Fig. 4.
Witnesses
Q. B. Baenziger,
Grace E. Wynkoop.
Inventor
Frederick Leadbeater
by J. E. Thomas
Attorneys

UNITED STATES PATENT OFFICE.

FREDERICK LEADBEATER, OF DETROIT, MICHIGAN.

VALVE.

956,811.

Specification of Letters Patent.

Patented May 3, 1910.

Application filed September 16, 1909. Serial No. 517,970.

*To all whom it may concern:*

Be it known that I, FREDERICK LEADBEATER, citizen of the United States, residing at Detroit, county of Wayne, State of Michigan, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

My invention relates to an improvement in valves, shown in the accompanying drawings and more particularly pointed out in the following specification and claims.

The object of my invention is to construct a valve dispensing with the usual stuffing box packing encircling the valve stem, but providing, however, a steam tight joint where the stem projects through the valve body by means equally effective, but more simple in construction and of lower cost of manufacture.

Other advantages and improvements will hereafter appear.

In the drawings accompanying this specification:—Figure 1 is a central vertical section through the valve with parts in elevation. Fig. 2 is a perspective view of the annular screw-threaded sleeve engaging the valve. Fig. 3 is a perspective view of the annular screw-threaded thimble engaging the valve stem and having a locking engagement with the sleeve shown in Fig. 2. Fig. 4 is a plan view of the annular thimble disclosing the lugs which interlock with the sleeve.

Referring now to the letters of reference placed upon the drawings: A is the body of the valve and B the valve seat.

C is the valve bonnet having the usual screw-threaded engagement with the valve body.

D is the valve stem and D' its operating handle.

E is the valve and E' a composite disk formed of suitable material and secured thereto by the bolt $E^2$. The dotted lines $E^3$ in the valve indicate grooves to receive the projecting ways C' formed in the wall of the bonnet C, which serve to hold the valve against rotation and guide it when raised upon actuating the valve stem.

F is an annular sleeve having a screw-threaded engagement with the valve E, provided at the top with an hexagonal head $f$ for the use of a wrench in screwing the sleeve into engagement with the valve.

G is an annular thimble provided with projecting lugs $g$ adapted to enter corresponding notches $f'$ in the sleeve F whereby the two are brought into locking engagement.

$D^2$ is a disk-shaped flange formed on the valve stem and recessed above to receive a suitable packing disk $d$ adapted to bear on the annular rim or seat $c$, formed on the inner wall of the bonnet C.

H and H' are nuts having a screw-threaded engagement with the valve stem where it projects beyond the bonnet,—the thread being cut in the opposite direction to that engaging the thimble G,—the nut H' serving to lock the nut H against accidental displacement when the latter has been properly adjusted.

Having indicated the several parts by reference letters, the operation of my improved valve will be readily understood.

In assembling the parts, the valve stem is inserted through the opening in the bonnet from the underside and the nuts engaged before the operating handle is attached to the stem. The thimble G and the sleeve F are then assembled and the valve E brought into screw-threaded engagement with the sleeve. The valve stem carrying the several parts is then raised in the bonnet until the flange $D^2$ bears against the annular rim $c$,— the ribs C' in the bonnet entering the grooves $E^3$ of the valve. The nut H is then run down until the packing ring in the disk $D^2$ is forced to its seat, or to a steam tight joint with the annular rim $c$. The locking nut H' is now brought into contact with the nut H below, locking the same against accidental displacement. The bonnet is then engaged with the valve body and the operating handle attached to the valve stem. The device is now ready for installation. It will be observed that the thread engaging the thimble to the valve is a regular left hand thread while the thread on the stem above, on which the nuts are mounted is a right hand thread. By this arrangement the nuts H and H' will not become displaced upon operating the valve. The valve may now be raised or seated in the usual way by means of the operating handle,— the nuts H and H' turning with the valve stem. Should it become necessary to tighten the valve, the nut H is adjusted and the nut H' set to lock it against displacement. In place of the nut H', a split washer may be employed to lock the nut H.

It will be observed by reference to Fig. 1, that a small amount of play is provided between the thimble and sleeve,—the opening through the sleeve being somewhat larger than required for the passage of the thimble,—thereby providing for a slight movement between the parts in order that the valve may be properly seated when the valve stem is actuated.

Having thus described my invention, what I claim is:—

1. In a valve, a body portion, a bonnet secured thereto, a valve stem provided with right and left hand threads, a flange integral with said stem adapted to be seated against the wall of the bonnet, a packing disk carried by said flange, a thimble having a screw-threaded engagement with the valve stem and provided with projecting lugs, a sleeve encircling the thimble notched to receive said lugs, said thimble adapted for screw-threaded engagement with the valve, the valve, a nut engaging said valve stem adapted to force the flange of the valve stem to its seat, and means for securing said nut against accidental displacement, substantially as described.

2. In a valve, a body, a bonnet secured thereto, a valve stem provided with right and left hand threads, a flange carried by said stem adapted to be seated against the wall of the bonnet, a thimble having a screw-threaded engagement with the valve stem, a sleeve encircling said thimble, means for locking said parts together, said sleeve screw-threaded to receive the valve, the valve, a nut engaging the other screw-threaded portion of said stem adapted to force said flange to its seat, and means for locking the same when adjusted, substantially as described.

3. In a valve, a body, a bonnet secured thereto, said bonnet provided with guides, a valve grooved to receive the guides, a sleeve having a screw-threaded engagement with the valve, a thimble having a screw-threaded engagement with the valve stem and an interlocking engagement with the sleeve, a flange carried by said stem adapted to be forced to a seat against the valve bonnet body but free to turn, a nut engaging said stem adapted to hold said flange against its seat, and means for securing said nut when adjusted, substantially as described.

In testimony whereof, I sign this specification in the presence of two witnesses.

FREDERICK LEADBEATER.

Witnesses:
GRACE E. WYNKOOP,
SAMUEL E. THOMAS.